Patented Aug. 19, 1947

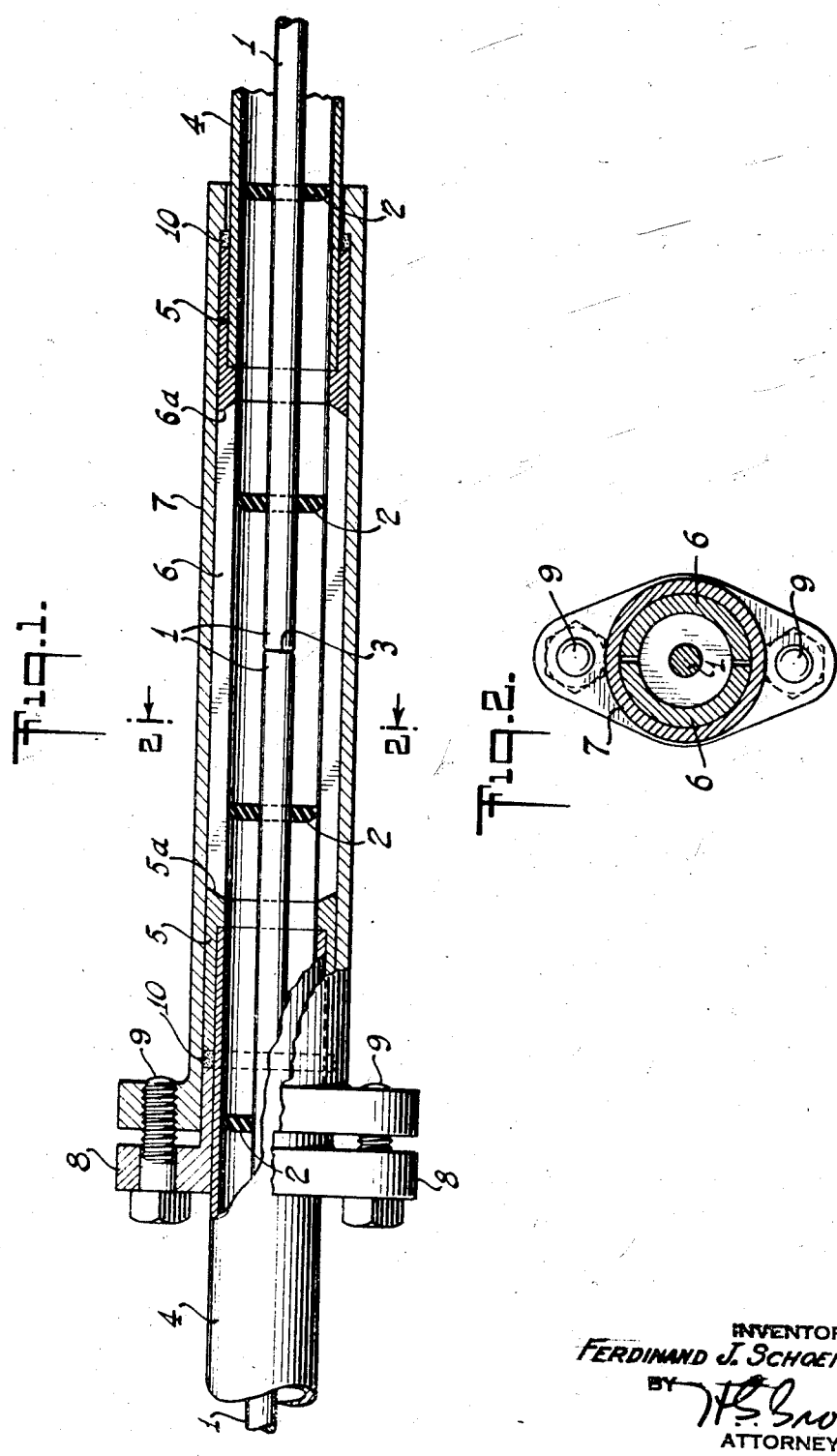

2,425,959

UNITED STATES PATENT OFFICE 2,425,959

COAXIAL LINE COUPLING

Ferdinand J. Schoenborn, Riverhead, N. Y., assignor to Radio Corporation of America, a corporation of Delaware Application July 18, 1942, Serial No. 451,426

5 Claims. (Cl. 174—88)

This invention relates to a new and useful method of joining or splicing coaxial transmission lines in such a manner that the line will be assured of constant electrical and mechanical characteristics throughout the splice and line proper.

This invention is particularly adapted for splicing concentric or shielded lines having a fluid within the outer hollow conductor.

An object of this invention is to provide means for joining two ends of a transmission line in such a way that it will assure good electrical conductivity, strong mechanical characteristics, and gas-tight joining means.

Another object of this invention is to maintain the inner and outer conductors free of irregular projections which will give rise to discontinuities in the electrical characteristics.

A feature of this invention is the novel way of joining the ends of the inner conductor by silver soldering, or other means, without increasing the diameter, by joining them in such a way as to keep the spacing of the insulators uniform. The outer conductor of the line is joined by inserting a split sleeve between two of the ends of the outer conductor to be coupled together, thereby keeping the inner diameter uniform throughout. A sleeve coupling over the joint provides alignment for the conductors, and also a gas-tight seal.

Methods known in the prior art employed sleeves for joining the inner conductors and splice boxes or couplings for the outer conductors. This arrangement resulted in bumps or discontinuities in the electrical characteristics, as well as weak mechanical joints. This invention will overcome such difficulties as were encountered in prior art methods.

This invention will best be understood by referring to the accompanying drawing in which:

Fig. 1 is a longitudinal view of a concentric line, shown partly in section and partly in elevation; and Fig. 2 is a cross-sectional view, the section being taken at line 2—2 of Fig. 1.

Referring now in detail to the drawing, the inner conductors 1 are provided with insulating discs 2 arranged to be spaced at regular intervals. The ends of the inner conductors are arranged to butt each other at a point 3, and are silver-soldered together at this point. The ends of each one of the outer conductors 4 are fitted with sleeve-like end sleeves 5 having inwardly extending tapered portions 5a, which taper to terminate at the same diameter as the inside diameter of the conductor 4. The end sleeves 5 are joined by a two piece longitudinally split sleeve 6, having their ends also tapered outwardly at an angle 6a to correspond with the inwardly extending tapered portions 5a on sleeves 5. Contact pressure and alignment between end sleeves 5 and the split sleeve 6 is maintained by drawing a coupling sleeve 7 and a gland bushing 8 together by means of bolts 9. Coupling sleeve 7 and gland bushing 8 both have extending ears with holes to receive bolts 9. A gas or fluid-tight seal is maintained by the use of suitable strips or washers 10 of packing material located at an end of each end sleeve 5. The splice coupling of this invention is used to connect various lengths of coaxial transmission lines for long runs, or where lines outside and inside of the building installations are to be joined.

In setting up a coaxial line, the procedure of this invention is as follows:

The coupling sleeve 7 and bushings 8 are slipped onto the respective ends of the outer conductors 4 which are to be joined. The end sleeves 5 are then secured onto the ends of the outer conductor 4 by soft soldering, or other means. The ends of the inner conductors 1 are cut to the appropriate length and butt-joined by silver soldering in a suitable alignment jig (not shown), thereby providing similar, or greater, tensile strength at this point in comparison to what exists throughout the inner conductor. The alignment jig should be so designed as to prevent damage to the insulators 2 from the relatively high heat employed during the silver soldering operation. The split sleeve 6 is then inserted, and the packing material strips 10 are applied. The whole assembly is enclosed by bringing the coupling sleeve 7 and bushings 8 into place, and by applying pressure through the bolts 9 to draw the two end sleeves 5 toward each other, thereby making the arrangement a smooth electrical, strong mechanical and gas-tight joint.

The splice coupling of this invention may be applied on lines of large diameters; in such cases a bolt or plug may be used for joining the inner conductor, which is so constructed as not to increase the outer diameter of the inner conductor.

This invention can be modified for use with twin conductor shielded lines, or for coupling lines of different size or impedance, or the joining of the inner conductor can be changed to bolts or threaded parts, depending upon the size involved; and therefore should not be limited to the precise arrangement shown.

What is claimed is:

1. A coaxial cable splice for joining ends of the conductors together comprising inner and outer conductors concentrically arranged with spaced insulating members, said inner conductor having its ends butt joined, and maintained with a constant outside diameter, an end sleeve secured to each one of said outer conductors, said end sleeves having inwardly extending tapered portions, a longitudinally split sleeve having outwardly extending tapered ends and the same internal diameter as the internal diameter of said outer conductors, said split sleeve being interposed between opposed ends of the end sleeves on the outer conductors, a tubular clamping member surrounding said split sleeve and said end sleeves, said tubular clamping member having a shouldered portion on one end thereof for engaging one of said end sleeves, and means for isolating the interior of the outer conductor from the atmosphere, said means being located at the other end of said tubular clamping member for retaining said outer conductor ends in gas-tight engagement and alignment by drawing said end sleeves and longitudinal split sleeve together.

2. A coaxial cable splice for joining ends of the conductors together comprising inner and outer conductors concentrically arranged with spaced insulating members, said inner conductor having its ends butt joined and maintained with a constant outside diameter, an end sleeve secured to each one of said outer conductors by being soft soldered thereto, said end sleeves having inwardly extending tapered portions, a longitudinally split sleeve having outwardly extending tapered ends and the same internal diameter as the internal diameter of said outer conductors, said split sleeve being interposed between opposed ends of the end sleeves on the outer conductors, a tubular clamping member surrounding said split sleeve and said end sleeves, said tubular clamping member having a shouldered portion on one end thereof for engaging one of said end sleeves, and means for isolating the interior of the outer conductor from the atmosphere, said means being located at the other end of said tubular clamping member for retaining said outer conductor ends in gas-tight engagement and alignment by drawing said end sleeves and longitudinal split sleeve together.

3. A high frequency cable coupling for a transmission line comprising an outer and inner conductor coaxially arranged with insulating members; said inner conductor having its ends joined to maintain a uniform outside diameter and without disrupting the arrangement of said insulating members, end sleeves secured to ends of each one of said outside conductors, said end sleeves having concave tapered ends, a longitudinally split sleeve to enclose said joint of said inner conductor, said split sleeve having tapered ends complementary to the taper of said end sleeves and the same internal diameter as the internal diameter of said outer conductor, a coupling sleeve enclosing said end sleeves and said split sleeve, said coupling sleeve having a shouldered end portion and extending ears with threaded apertures therein located at an end opposite said shouldered end portion, packing material adjacent to said end sleeves, a gland bushing having extending ears with apertures therein to align with the apertures in said coupling sleeve, and means passing through said apertures to draw said coupling sleeve, packing material and said gland bushing together by the cooperation of said shouldered end portion, thereby applying pressure onto the tapered contact ends of said end sleeves and said split sleeve, also applying pressure to said packing material between said end sleeves, said coupling sleeve and said gland bushing, providing thereby a good electrical, mechanically aligned, gas-tight joint for the outer conductor, with uniform inside diameter throughout to maintain the same electrical characteristics as the rest of the line.

4. A high frequency cable coupling for a transmission line comprising an outer and inner conductor coaxially arranged with insulating members; said inner conductor having its ends joined to maintain a uniform outside diameter and without disrupting the arrangement of said insulating members, end sleeves secured to ends of each one of said outside conductors, said end sleeves having concave tapered ends, a longitudinally split sleeve to enclose said joint of said inner conductor, said split sleeve having tapered ends complementary to the taper of said end sleeves and the same internal diameter as the internal diameter of said outer conductor, a coupling sleeve enclosing said end sleeves and said split sleeve, said coupling sleeve having a shouldered end portion and extending ears with threaded apertures therein located at an end opposite said shouldered end portion, packing material adjacent to said end sleeves, a gland bushing having extending ears with apertures therein to align with the apertures in said coupling sleeve, and means including clamp bolts passing through said apertures to draw said coupling sleeve, packing material, and said gland bushing together by the cooperation of said shouldered end portion, thereby applying pressure onto the tapered contact ends of said end sleeves and said tapered sleeve, also applying pressure to said packing material between said end sleeves, said coupling sleeve and said gland bushing, providing thereby a good electrical, mechanically aligned, gas-tight joint for the outer conductor to maintain the same electrical characteristics as the rest of the line.

5. In a high frequency cable comprising an inner and outer conductor coaxially arranged with insulating members, said inner conductor having its ends joined together maintaining a uniform outside diameter throughout its length, a longitudinally split sleeve having tapered ends and the same internal diameter as said outer conductor, end sleeves secured to the ends of said outer conductor, said end sleeves having tapered ends complementary to the taper in said split sleeve, said longitudinally split sleeve being interposed between two ends of said outer conductor to abut the end sleeves, a coupling sleeve having a portion of reduced diameter for engaging an end of one of said end sleeves located at one of the outer conductor ends, said coupling sleeve enclosing said split sleeve and said end sleeves for alignment thereof, a gland bushing, a gland of packing material interposed between an end of one of said end sleeves and said coupling sleeve, a gland of packing material interposed between another one of said end sleeves and said gland bushing, means for drawing said coupling sleeve, split sleeve, end sleeves and packing glands together thereby establishing electrical contact between the split sleeve and said end sleeves and providing a gas tight seal.

FERDINAND J. SCHOENBORN.

REFERENCES CITED

The following references are of record in the file of this patent:

UNITED STATES PATENTS

| Number | Name | Date |
| --- | --- | --- |
| 2,305,668 | Bruno | Dec. 22, 1942 |
| 2,209,152 | Daniels | July 23, 1940 |
| 2,153,527 | Battermann | Apr. 4, 1939 |
| 2,256,066 | Usselman | Sept. 16, 1941 |
| 2,293,155 | Mample | Aug. 18, 1942 |
| 2,296,766 | Bruno | Sept. 22, 1942 |
| 2,156,772 | Seeley | May 2, 1939 |